Aug. 12, 1947.        P. J. DASHER ET AL        2,425,514
SELF-SEALING FUEL TANK
Filed Aug. 16, 1940
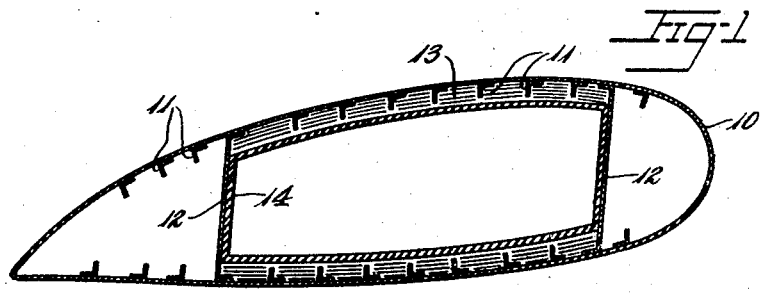
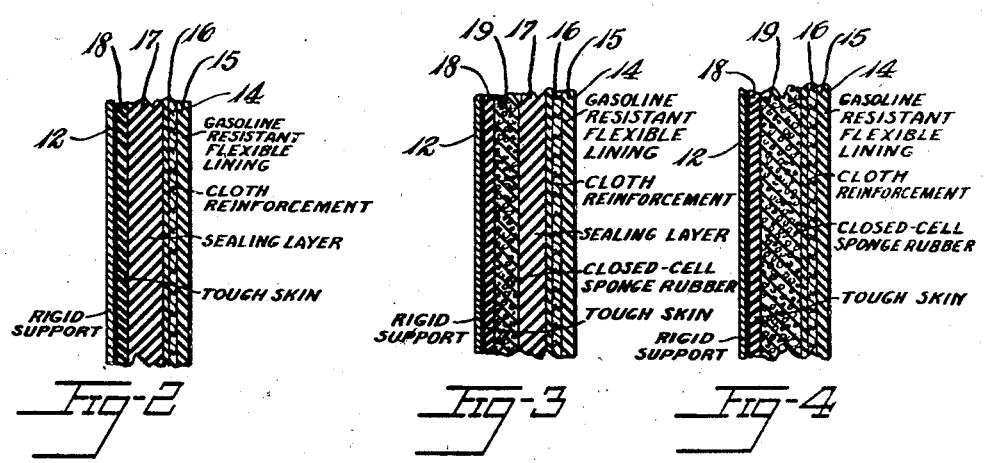
Inventors
Paul J. Dasher
Richard A. Crawford
Russell S. Colley Patented Aug. 12, 1947

2,425,514

UNITED STATES PATENT OFFICE 2,425,514

SELF-SEALING FUEL TANK

Paul J. Dasher, Stow, Richard A. Crawford, Akron, and Russell S. Colley, Kent, Ohio, assignors to The B. F. Goodrich Company, New York, N. Y., a corporation of New York Application August 16, 1940, Serial No. 352,900

9 Claims. (Cl. 154—43.5)

1

This invention relates to self-sealing tanks such as gasoline tanks for airplanes which must not be permitted to leak even after puncture by small arms projectiles.

Constructions heretofore proposed for preventing leakage from perforated fuel tanks have suffered from a number of disadvantages, such as failure to seal the large jagged hole left at the exit of a projectile from the tank, and loss of large volumes of fuel by absorption in the sealing layer or by flow into spaces between a perforated tank and a sealing covering. Previously known constructions have accordingly not met the need for a container which will not lose its content of fuel when subjected to small arms fire.

We have found that a very high degree of security against leakage, together with an insignificant loss of fuel into or through the sealing members, can be achieved by making the tanks for fuel and other similar liquids carried on aircraft and on combat vehicles generally of a special composite construction. This construction includes an inner layer of gasoline-resistant flexible material, preferably a synthetic rubber-like material, which may contain a fabric reinforcement, in contact with the contents of the tank, a relatively thick sealing layer, and an outer skin. If the tank is to be filled with a liquid other than gasoline, such as a hydrocarbon oil, the materials used will be such as will have the desired properties when in contact with the liquid. Because it is not completely rigid, it is ordinarily preferred to enclose this composite tank completely, except for the necessary inlets, outlets and other connections, by a rigid supporting structure, in which it fits snugly without free spaces or wrinkles.

The inner gasoline-resistant layer may be a foil such as Cellophane or metal foil or any of the various flexible gasoline-resistant compositions possessing the requisite strength and resiliency over the range of temperatures encountered in aviation service, such as poly-ethylene polysulfide, polyvinyl alcohol plasticized with glycerine or the like, polyvinyl chloride plasticized with gasoline-insoluble aromatic liquids, neoprene (polymerized chloroprene), or the rubbery copolymer of butadiene and acrylonitrile, and preferably the latter, although neoprene is quite satisfactory for fuels substantially free from aromatic compounds. Such compositions, when properly prepared, are quite resistant to tear, especially when reinforced by a suitable fabric,

2 and promptly close behind a projectile which pierces them.

The sealing layer should exhibit sufficient strength and resilience to permit yield of the material and recovery after rupture by projectiles without appreciable loss of any material, and should swell rapidly when in contact with gasoline, but should not dissolve appreciably in the gasoline. One such material is ordinarily vulcanized soft rubber. A material which has the special advantage of very light weight for a given volume is closed-cell sponge rubber, and especially the type prepared by absorption of compressed nitrogen gas in rubber and release of pressure to bring about expansion during vulcanization of the rubber, characterized by presence of very small, uniform, closed pores, and variously known as gas-expanded rubber, moss rubber, foam rubber and caoutchouc mousse. Another such material consists of a mixture of a rubbery material which swells in gasoline (and may even be quite soluble in gasoline) with a gasoline-insoluble rubbery material (such mixtures are claimed in a copending patent application of one of us— Richard A. Crawford, Serial No. 351,195, filed August 3, 1940) typical examples being mixtures of rubbery polyisobutylene with vulcanizable rubber or synthetic rubber which is then vulcanized, or mixtures of unvulcanized rubber with a material such as the rubbery copolymer of butadiene and acrylonitrile which is gasoline-resistant even when unvulcanized, or even mixtures of unvulcanized rubber with neoprene, the neoprene alone being vulcanized. Appreciable proportions of each of the two types of ingredients must be present in order that the desired properties may be manifested and preferably neither one should greatly exceed three times the quantity of the other.

It is not essential that the sealing layer be made throughout of a single material, for it is possible and sometimes advantageous to make different portions of it of different materials or even to subdivide the total thickness of the sealing layer into a plurality of portions and interpose other materials of any of the three types, namely, gasoline-impervious, or sealing material, or tough skins.

The outer skin may be any material of high tear resistance and fairly high tensile strength such as vulcanized sheet rubber or synthetic rubber, fabric or rubberized fabric, felt, leather or the like.

The supporting structure should be sufficiently strong to support several times the weight of the contents of the tank so as to resist the surges and centrifugal forces arising as a result of the maneuvers of the supporting vehicle. The material in direct contact with the tank structure should be of such a nature as not to produce jagged splinters or exfoliations when pierced or fractured. If metal, it should be a ductile metal of moderate thickness which exhibits only a small projecting ridge when pierced by a projectile. In many cases the tank will be located in otherwise waste space in close proximity to an outer surface of a vehicle provided with internal reinforcements or other projections, in which case fillers may be provided between the projections to establish a smooth supporting surface or at least reduce the degree of irregularity of the surface. Such fillers may be of even-grained wood such as white pine but are preferably of a very light weight material which is rigid but somewhat resilient so that large fragments do not tend to break out of it when pierced, such as balsa wood, hard rubber sponge, cork blocks and the like.

The total thickness of the composite tank structure must at least approximate the diameter of the projectile the tank is likely to encounter. Small arms projectiles are ordinarily pointed, and are fired from a rifle so that they enter pointed end first, leaving a clean hole at the point of entrance, with mainly lateral displacement and only slight exfoliation of metals which are pierced, and only slight fracture or splintering of wood. Such irregularities as are produced in the supporting structure at the point of entrance are therefore of smaller magnitude than thickness of the sealing layer and are accommodated in the outer zones of the resilient sealing layer without producing sufficient distortion to hold open the hole through the tank wall. In entering the tank, the projectiles are usually deflected sufficiently that they leave the tank sideways or while tumbling end over end and consequently make a large, jagged hole in the supporting structure at the point of exit, with pronounced splinters and exfoliations extending in the direction of travel of the projectile, but since this direction is away from the tank wall such projections can do no harm and will not hold open any holes in the sealing layer as would be the case if the sealing layer were outside of a metal tank. Care must be taken to avoid any adhesion of the tank to the supporting structure, else any deformation of the supporting structure would tend to hold open holes in the tank wall and permit leakage.

If the course of the projectile is through the body of liquid in the tank, the projectile produces in the liquid ahead of it a pressure cone. If the tank wall is not adequately supported this high local pressure will bulge the tank wall so that the passage of the projectile produces not simply a small hole but a large tear. It is therefore important that the outer surface of the tank wall be in close contact throughout its extent with a supporting structure of adequate strength and rigidity. Furthermore, in order to minimize the extent of tearing which may result from perforation of the tank after partial destruction of the supporting structure, it is important that both surfaces of the tank wall, and particularly the outer surface, resist tearing to as great an extent as possible.

When small arms projectiles are fired through a tank constructed in the manner outlined above, they produce only small displacements of the supporting structure at the point of entrance, and the more extensive displacements at the point of exit extend away from the tank and do not affect the tank itself. The holes through the tank wall immediately close behind the projectile because of the resiliency of the materials used. Any slight seepage which may occur through the inner tank surface will come in contact with the sealing layer and be absorbed in it, swelling it rapidly until the opening is tightly closed. Furthermore, because of insolubility of the materials in gasoline, there will be no contamination of the fuel by dissolved solids which might tend to clog carburetors.

Typical constructions embodying this invention are shown in the accompanying drawings in which Fig. 1 represents a cross-section of an airplane wing tank in place;

Fig. 2 is a fragmentary section of the tank wall on an enlarged scale, and

Figs. 3 and 4 are similar sections of alternative tank wall constructions.

In Fig. 1 the metal surface 10 of an airplane wing is provided with reinforcing stringers 11, 11. The central portion of the inside of the wing, which is to be occupied by the tank, is set off by partitions 12, 12 which may be made of metal and which serve as lateral supports for the tank. The spans between the stringers 11 are filled in with slabs 13 of balsa wood so as to provide a flat bed for the vertical support of the tank. The tank 14 is of such size as just to fit snugly against its supporting surfaces.

The tank 14, as shown in Fig. 2, is made up of an inner gasoline-resistant layer 15 of a vulcanized copolymer of butadiene and acrylonitrile, in which is embedded a strong, tear-resistant fabric 16 such as 24 oz. duck, the thickness of the layer 15 outside the fabric being about .07 inch. Adhered to the layer 15 is a sealing layer 17 about .20 inch thick, of a mixture of about equal parts of unvulcanized rubber and of an unvulcanized rubbery copolymer of butadiene 55–65% and acrylonitrile 45–35%, to which may be added, if desired, a plasticizer for the copolymer such as dibutyl phthalate in an amount up to about one-fourth the weight of the copolymer. This sealing layer, because of its rubber content, will swell when brought into direct contact with gasoline, but, because of its content of the copolymer, which is insoluble in gasoline and thoroughly intermingled with the rubber, it will not dissolve appreciably, and because it is unvulcanized it remains sufficiently plastic and self-adherent under ordinary conditions to minimize danger that any hole once closed will reopen under the shock of a subsequent hit. Finally, adhered to the sealing layer 17 is an outer skin 18 of vulcanized sheet rubber about .09 inch thick, in direct contact with but not adhered to any part of the supporting structure 12, 13. This skin should have the maximum possible toughness and resistance to tear, hence it is advantageous to make it of a rubber composition containing reinforcing pigments such as carbon black and vulcanized with the aid of accelerators free from tendency to overcure such as the mercaptothiazoles and their derivatives, as will be well understood by rubber technologists.

A fuel tank so constructed may be pierced by an almost indefinite number of .30 caliber machine gun bullets and even by a considerable number of .50 caliber bullets with little or no leakage, and such leaks as do appear almost always close very soon as a result of the swelling of the sealing layer 17 by the gasoline.

In the modification shown in Fig. 3, the plastic sealing layer 17 occupies only part of the space between the lining 15 and the outer skin 18, the remainder being made up of closed-cell gas-expanded rubber 19, which may be either inside or outside of the layer 17 but preferably outside as shown. This construction has the advantage of considerably lighter weight for a given thickness, and combines the self-sealing qualities of the plastic 17, with the ability of the compressible layer 19 to accommodate irregularities which may be produced by perforation of the supporting structure. A still further saving in weight may be effected by omitting the plastic and making the entire sealing layer of the closed-cell gas-expanded rubber 19, as is shown in Fig. 4, in which case the layer 19 will tend to close any perforations by swelling in the gasoline, although it will lack the self-adherence of the plastic composition 17.

It is to be understood that the embodiments herein specifically described are illustrative and that equivalents may be substituted as has been fully pointed out above.

We claim:

1. A self-sealing flexible tank comprising a lining of gasoline-impervious vulcanized synthetic rubber-like material, a rubbery sealing layer which will swell in gasoline but will not dissolve in gasoline, and a tough, tear-resistant outer skin, all adhered together.

2. A self-sealing flexible tank comprising a gasoline-impervious resilient lining, a sealing layer of a mixture including a rubbery material which swells in gasoline with a rubbery material which is insoulble in gasoline, and a tough, tear-resistant outer skin, all adhered together.

3. A self-sealing flexible tank comprising a gasoline-impervious resilient lining, a composite sealing layer including a mixture of a rubbery material which swells in gasoline with a rubbery material which is insoluble in gasoline and a closed-cell gas-expanded sponge rubber, and a tough, tear-resistant outer skin, all adhered together.

4. A self-sealing tank comprising a flexible container having a gasoline-impervious lining, a rubbery sealing layer which will swell in gasoline but will not dissolve in gasoline, and a tough, tear-resistant outer skin, all adhered together, and a rigid supporting structure in contact with the outer skin throughout its extent.

5. A self-sealing tank comprising a flexible container having a gasoline-impervious lining of a vulcanized synthetic rubber-like material, a rubbery sealing layer which will swell in gasoline but will not dissolve in gasoline, and a tough, tear-resistant outer skin, all adhered together, and an irregular supporting structure, the irregularities of which are filled in by rigid porous fillers so that the tank is in direct contact with but not adhered to a substantially smooth solid support.

6. A self-sealing tank comprising a flexible container having a gasoline-impervious lining of a vulcanized synthetic rubber-like material, a sealing layer of a closed-cell gas-expanded sponge rubber, and a tough, tear-resistant outer skin, all adhered together, and an irregular supporting structure the irregularities of which are filled in by rigid porous fillers so that the tank is in direct contact throughout its extent with a substantially smooth solid support.

7. A self-sealing tank comprising a flexible container having a gasoline-impervious resilient lining of a vulcanized copolymer of butadiene and acrylonitrile having a fabric reinforcement, a sealing layer of a mixture of a rubbery material which swells in gasoline with a gasoline-insoluble rubbery copolymer of butadiene and acrylonitrile, and a tough, tear-resistant outer skin, all adhered together, and an irregular metallic supporting structure, the irregularities of which are filled in by balsa wood fillers so that the tank is in direct contact throughout its extent with a substantially smooth solid support.

8. A self-sealing tank comprising a flexible container having an impervious lining, a rubbery sealing layer and a tough, tear-resistant outer skin, all adhered together, and a rigid supporting structure in contact with the outer skin throughout its extent but not adhered to it.

9. A self-sealing tank comprising a flexible container having a gasoline-impervious lining, a rubbery sealing layer which will swell in gasoline but will not dissolve in gasoline, and a tough, tear-resistant outer skin, all adhered together, and a rigid supporting structure in contact with the outer skin throughout its extent but not adhered to it.

PAUL J. DASHER.
RICHARD A. CRAWFORD.
RUSSELL S. COLLEY.

REFERENCES CITED

The following references are of record in the file of this patent:

UNITED STATES PATENTS

| Number | Name | Date |
| --- | --- | --- |
| 1,298,080 | Mougey et al. | Mar. 25, 1919 |
| 1,349,290 | Murdock | Aug. 10, 1920 |
| 2,102,590 | Gray et al. | Dec. 21, 1937 |
| 1,870,595 | Thaden | Aug. 9, 1932 |
| 1,781,446 | Dornier | Nov. 11, 1930 |
| 1,312,745 | Murdock | Aug. 12, 1919 |
| 2,170,947 | Habgood et al. | Aug. 29, 1939 |

FOREIGN PATENTS

| Number | Country | Date |
| --- | --- | --- |
| 301,089 | Great Britain | Sept. 26, 1929 |
| 363,262 | Great Britain | Dec. 17, 1931 |
| 130,955 | Great Britain | Nov. 29, 1920 |
| 316,117 | Great Britain | July 23, 1929 |